US012137027B2

(12) United States Patent
Celozzi et al.

(10) Patent No.: US 12,137,027 B2
(45) Date of Patent: Nov. 5, 2024

(54) METHODS AND DEVICES FOR RESOURCE SHARING USING SMART CONTRACTS

(71) Applicant: Telefonaktiebolaget LM Ericsson (publ), Stockholm (SE)

(72) Inventors: Giuseppe Celozzi, Naples (IT); Luca Baldini, Rome (IT); Daniele Gaito, Naples (IT); Gaetano Patria, San Prisco (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 17/597,884

(22) PCT Filed: Aug. 6, 2019

(86) PCT No.: PCT/SE2019/050725
§ 371 (c)(1),
(2) Date: Jan. 27, 2022

(87) PCT Pub. No.: WO2021/025600
PCT Pub. Date: Feb. 11, 2021

(65) Prior Publication Data
US 2022/0166667 A1   May 26, 2022

(51) Int. Cl.
*H04L 41/0806* (2022.01)
*H04L 41/5019* (2022.01)
*H04L 41/5054* (2022.01)

(52) U.S. Cl.
CPC ...... *H04L 41/0806* (2013.01); *H04L 41/5019* (2013.01); *H04L 41/5054* (2013.01)

(58) Field of Classification Search
CPC ............ H04L 41/0806; H04L 41/5019; H04L 41/5054; H04L 41/0897; H04L 43/0805; H04L 43/0876; H04L 43/20; H04L 41/0895; H04L 41/40; H04L 63/12; H04W 48/18; H04W 48/14
See application file for complete search history.

(56) References Cited

U.S. PATENT DOCUMENTS

| | | | |
|---|---|---|---|
| 2017/0141973 A1 | 5/2017 | Vrzic | |
| 2019/0109768 A1 | 4/2019 | Senarath et al. | |
| 2019/0379664 A1* | 12/2019 | Suthar | H04L 9/3239 |
| 2020/0057860 A1* | 2/2020 | Patil | G06F 21/6209 |
| 2020/0195495 A1* | 6/2020 | Parker | H04L 41/40 |

OTHER PUBLICATIONS

International Search Report and Written Opinion for Application No. PCT/SE2019/050725, dated Oct. 14, 2019, 21 pages.

(Continued)

*Primary Examiner* — Jung H Park
(74) *Attorney, Agent, or Firm* — Nicholson De Vos Webster & Elliott LLP

(57) ABSTRACT

Network slice providers and resource providers in a communication network are configured to cause various records related to a smart contract for one or more resources to be stored in a permissioned blockchain. The records include an allocation, a deallocation and monitoring records related to the resource(s). When the resources are released, the blockchain records ease settling slice beneficiaries' financial obligations.

16 Claims, 13 Drawing Sheets

(56) References Cited

OTHER PUBLICATIONS

3GPP TS 28.531 V16.2.0, "3rd Generation Partnership Project; Technical Specification Group Services and System Aspects; Management and orchestration; Provisioning; (Release 16)," Jun. 2019, 65 pages, 3GPP Organizational Partners.

3GPP TS 28.541 V15.1.0, "3rd Generation Partnership Project; Technical Specification Group Services and System Aspects; Management and orchestration; 5G Network Resource Model (NRM); Stage 2 and stage 3 (Release 15)," Dec. 2018, 232 pages, 3GPP Organizational Partners.

"Blockchain-Based Network Monitoring and Service Level Agreement (SLA) Verification System," Oct. 4, 2018, 13 pages, An IP.com Prior Art Database Technical Disclosure, IP.com.

Blue Planet—transformational software solutions from Ciena, 14 pages, downloaded from https://www.blueplanet.com/?src=packetdesign on May 20, 2019.

ETSI GR NFV-EVE 012 V3.1.1, "Network Functions Virtualisation (NFV) Release 3; Evolution and Ecosystem; Report on Network Slicing Support with ETSI NFV Architecture Framework," Dec. 2017, 35 pages, ETSI.

ETSI GS NFV-IFA 014 V2.1.1, "Network Functions Virtualisation (NFV); Management and Orchestration; Network Service Templates Specification," Oct. 2016, 35 pages, European Telecommunications Standards Institute.

Francesca Fossati et al., "Multi-Resource Allocation for Network Slicing," Feb. 5, 2019, 15 pages, IEEE.

Gabriel Antonio F. Rebello et al., "Providing a Sliced, Secure, and Isolated Software Infrastructure of Virtual Functions Through Blockchain Technology," 2019, 6 pages, IEEE 20th International Conference on High Performance Switching and Routing (HPSR).

Konstantinos Samdanis et al., "From Network Sharing to Multi-tenancy: The 5G Network Slice Broker," 2016, 11 pages, IEEE.

Sacha Kavanagh, "What is Network Slicing?," Aug. 28, 2018, 12 pages, downloaded from https://5g.co.uk/guides/what-is-network-slicing/ on May 20, 2019.

International Preliminary Report on Patentability, PCT App. No. PCT/SE2019/050725, Feb. 17, 2022, 18 pages.

Satoshi Nakamoto, "Bitcoin: A Peer-to-Peer Electronic Cash System," 2009, 9 pages, www.bitcoin.org.

\* cited by examiner

1100

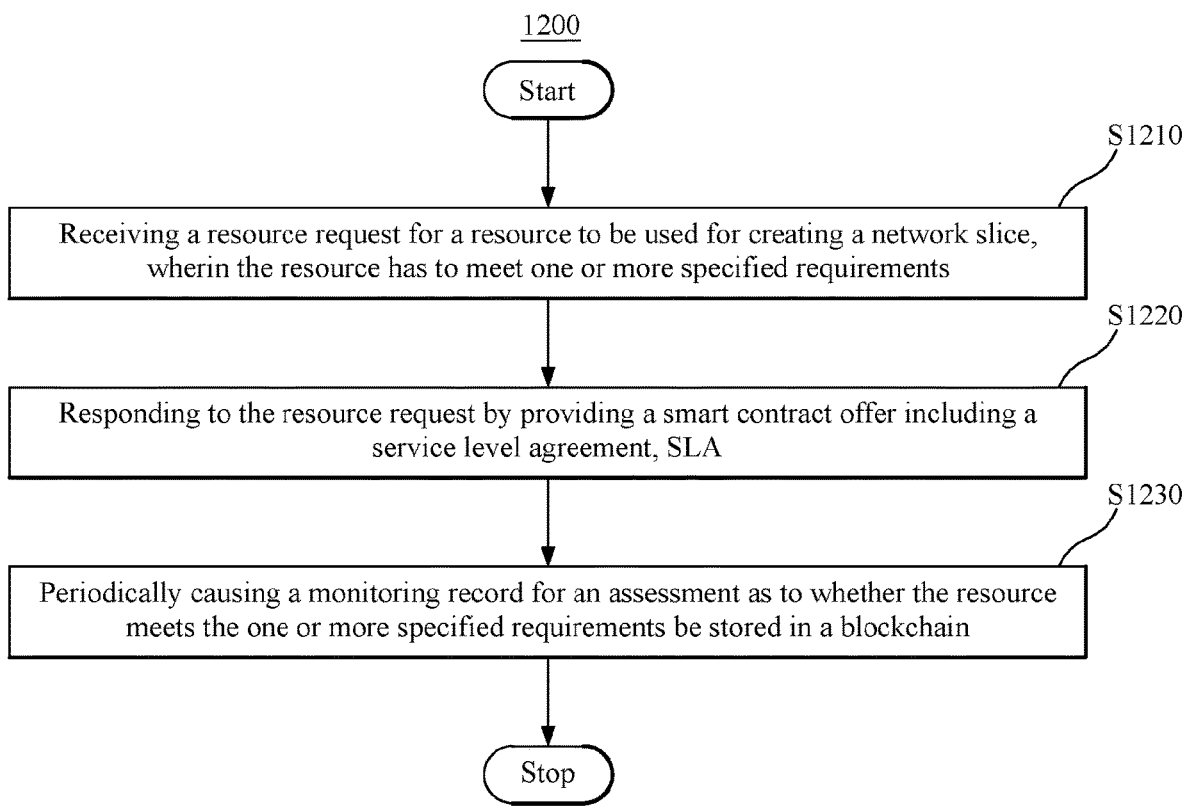

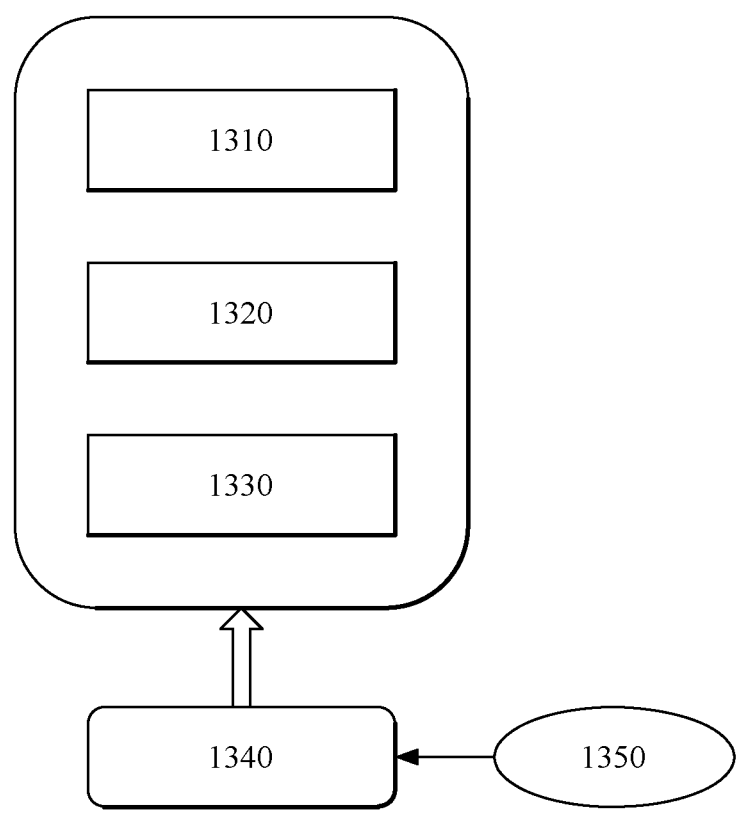

METHODS AND DEVICES FOR RESOURCE SHARING USING SMART CONTRACTS

CROSS-REFERENCE TO RELATED APPLICATIONS

This application is a National stage of International Application No. PCT/SE2019/050725, filed Aug. 6, 2019, which is hereby incorporated by reference.

TECHNICAL FIELD

Embodiments of the subject matter disclosed herein relate to resource sharing using a smart contract in the context of a network slice for a user. More particularly, records related to the smart contract (such as allocation, deallocation, modification thereof) are stored in a blockchain.

BACKGROUND

Network slicing has emerged as a major new networking paradigm for meeting the diverse requirements of various vertical businesses in virtualized software-based networks, such as in 5G.

A network slice is a dynamically created logical end-to-end network with an optimized topology to serve a specific use case (i.e., a service class or a customer). Typical use cases of different classes of Quality of Service (QoS) requirements can include enhanced Mobile Broadband (eMBB), ultra-Reliable and Low-Latency Communications (uRLLC), and massive Machine Type Communications (mMTC), as defined by the International Telecommunication Union (ITU). A mobile network operator can slice operational resources (e.g., routers and links) along with computing and storage resources and allocate them to a service. Though the technology is being spearheaded by the cellular telecommunications-focused 3rd Generation Partnership Project (3GPP), network slicing is likely to find application in fixed networks as well.

A network slice consists of all network resources and components (e.g., access resources, transport resources, cloud resources, network function and network management) configured together to serve a defined business purpose or customer. The network slices are created, changed and removed by network management functions.

Two appealing features of network slicing are orchestration and isolated performance guarantees. An orchestrator links network computational and storage resources to generate a network slice able to achieve a business goal (e.g., run a service or serve an end user). Isolated performance guarantees ensure one network slice cannot interfere with the performance of another slice. When a first network slice provides mission-critical services (such as emergency responses), other slices operate without interfering with this network slice. For example, a second slice may serve traditional cellular users, a third slice may be allocated for Internet of Things (IoT) devices, and perhaps a fourth slice provides a Mobile Virtual Network Operator (MVNO) customer, and so on.

Network slicing is a form of virtual network architecture combining Software Defined Network (SDN), Network Functions Virtualization (NFV) and radio bearers technologies for leveraging network functions and services in the slices. FIG. 1 illustrates an SDN architecture in which core functions of the network are centered in the SDN controller layer. Service providers and communication service providers can gain network control independence from network equipment vendors by simplifying network design, implementation and operation. The Network services are exposed to the business application. A business application in turn can select and configure (communicating behavior and needed resources) the network service. The network operator can set the network node through use of a simple programming method, rather than manually setting each of the numerous distributed units. Centralized functions of the SDN controller can be used to promptly handle network issues and greatly reduce time needed to provide a new network service or application.

As illustrated in FIG. 1, Business applications 10 in an application layer 11 may communicate behaviors and needed resources with network services 12 in a control layer 13 via application programming interfaces (APIs). The control layer 13 may then relay the instructions or requirements from the application layer 11 to the infrastructure layer 14, which may control forwarding and data processing capabilities for the network, such as forwarding and processing of the data path. Centralized functions of the SDN controller may be used to promptly handle network issues and greatly reduce the time that may be needed to provide a new network service or application.

FIG. 2 schematically illustrates a non-limiting example of a network functions virtualization management and orchestration (NFV-MANO) 20 architecture, with the network functions virtualization (NFV) management entities. NFV-MANO includes an NFV orchestrator (NFVO) 21 and a Virtualized Infrastructure Manager (VIM) 22 connected to a Virtual Network Function (VNF) manager 23. An Operations Support System/Business Support System (OSS/BSS) 24 is connected to the NFVO 21, and to an Element Management System (EMS) 25, which in turn is connected to VNF manager 23 and to VNF 26. VNF 26 is also connected to VNF manager 23 and to NFV infrastructure (NVFI) 27. NFVI 27 is connected to VIM 22, which is also connected to the NFVO 21 that manages the functionality of a Network Slice catalogue 28, a VNF catalogue 29, NFV instances 30 and NFVI resource 31.

SDN (FIG. 1) and NFV (FIG. 2) are currently being commercially deployed to deliver greater network flexibility by allowing traditional network architectures to be partitioned into virtual elements that can be linked (also through software).

Network slicing allows multiple virtual networks to be created on top of a common shared physical infrastructure. One of the key objectives of 5G networks is to support a variety of vertical industries such as smart grid, e-health and smart city. These verticals derive different use cases that impose stricter requirements than conventional services. These requirements can be satisfied only after significant improvements in the architecture. Network slicing can meet such requirements and therefore is likely to play a significant role in 5G networks.

An end-to-end (E2E) service supported by a slice may extend over different domains that may have different technologies. The E2E slice may consist of sub-slices that belong to one or more domains which implement and run the services requested by the verticals independently of each other with distinct sets of resources. Therefore, slicing is an enabler to support verticals on a single infrastructure while maintaining and satisfying QoS guarantees and service level agreements (SLAs) with the verticals.

FIG. 3 schematically illustrates a non-limiting example of levels of a network slice consistent with the recursive nature of a Network Slice Instance (NSI) and Network Slice Subnet Instance (NSSI) defined in Next Generation Mobile Networks (NGMN) and 3GPP. Each slice is identified by a single identifier for a specific administrative domain, and for each infrastructure segment (e.g., Radio Access Network (RAN), Mobile Edge Computing (MEC), etc.). At the top level, an E2E slice 32 across multiple domains includes the ordered, structured and connected slices from individual single domains: slice 33 in a first domain, slice 34 in a second domain, slice 35 in a third domain, etc. These single-domain slices are NSIs of the E2E multi-domain NSI, being controlled and managed by the respective domains. At the intermediate level, within an individual domain, a single-domain slice may include sub-slices (e.g., slice 33 has sub-slices 36, 37, 38 that may be related to Enterprise network, Radio Access Network (RAN), Mobile Edge Computing (MEC) or Edge network and Core network). The sub-slices 36, 37, 38 are all in Domain 1. Thus, the segment-specific sub-slices are NSIs of a single domain, and they are controlled and managed by the control and management functions in this domain. On a side note, the Enterprise network segment is often controlled and managed by a corresponding enterprise/vertical 39 that may own this Enterprise network. At the bottom level, a segment-specific sub-slice, for instance, may comprise the following or a subset of the following:

1. Structured and connected network functions 40 through service function chaining, typically based on a pre-defined network slice template/blueprint, as being defined in NGMN and 3GPP, the programmed data plane for QoS/SLA 41.
2. The physical and virtual resources 42, 43 to run these network functions, as defined in the NGMN network slice model.

FIG. 4 schematically illustrates correspondence between 3GPP and European Telecommunications Standards Institute (ETSI) NFV network slice concepts. According to this correspondence, a Network Slice Instance (NSI) 44 and a Network Slice Subnet Instance (NSSI) 45 may be mapped in the Network Service Instance 46 in ETSI NFV Standard, see ETSI GR NFV-EVE 012 V3.1.1-2017-12. NSI 44 is used by a communication service 47. NSSI 45 contains one or more NF 48 whereas the Network Service Instance 46 may include VNFs and Physical Network Functions (PNFs) 49.

In view of this correspondence, slice management may occur according to the framework schematically represented in FIG. 5. FIG. 5 illustrates a non-limiting example of the 3GPP network slice management in the NFV framework, where the 3GPP slice-related management functions 51 are connected to the ETSI NFVO 21 (see it also in FIG. 2) via the Os-Ma-Nfvo interface 52, and to the EMS 25 (see it also in FIG. 2) via the Os-Ma-Nfvo interface 52. The entities on the left side of FIG. 5 may be used for slice management. NFVO 21 may include the SDN controller and may interface with VIM 22 to allocate links and VNFs 26 and/or PNFs 56. The bottom part of FIG. 5 illustrates the network infrastructure.

Communication with the SDN controller which uses an internal interface is not shown. The network slice management 51 in the NFV framework comprises a Communication Service Management Function 53, a Network Slice Management Function 54 and a Network Slice Subnet Management Function 55. As also illustrated in FIG. 2, NFVO 21 is connected to VNFM 23 and VIM 22, VNFM 23 is connected to EMS 25 and to VNFs 26, and NFVI 27 is connected to VIM 22 and to PNFs 56, which are also connected to EMS 25.

The problem of resource sharing has continuously been an issue receiving lots of attention. For example, the paper, "Multi-Resource Allocation for Network Slicing," by F. Fossati et al. (retrievable from https:\\hal.archives-ou-vertes.fr/hal-02008115/document) discusses the problem of fairly sharing multiple resources between slices in the critical situation in which the network does not have enough resources to fully satisfy slice demands. Another paper, "From Network Sharing to Multi-tenancy: The 5G Network Slice Broker," by K. Samdanis et al. (retrievable from https:\\arxiv.org/ftp/arxiv/papers/1605/1605.01201.pdf) argues that mobile operators sharing network infrastructures accelerate network rollouts and offer services to customers with reduced costs. In urban areas, network sharing can help avoid complex and lengthy processes for site acquisition due to regulation issues, especially in highly populated regions where dense deployments restrict the available space, while for rural areas, sharing can reduce the network investment payback period.

Two different roles can be defined for network sharing solutions:
 (i) Infrastructure Provider (InP) responsible for physical network deployment and maintenance. Mobile Network Operators (MNOs) or third parties that interact with other "players" but not with end users directly can take the InP role.
 (ii) Mobile Virtual Network Operator (MVNO) lacks network infrastructure or has limited capacity and/or coverage, and leases resources from an existing InP.

Future multi-tenant systems are envisioned to expand the afore-mentioned roles to also include:
 (iii) Over-The-Top (OTT) service providers operating on top of a network infrastructure belonging to an MNO and based on a pre-defined Service Level Agreement (SLA) set of requirements.
 (iv) Vertical industries exploiting an MNO network infrastructure for services complementary to the telecommunications industry.

In both cases, the allocated network slices can be provided on a permanent basis or on demand (i.e., periodically or opportunistically). This paper provides an overview of 3GPP standardization activities on network sharing, focusing on the business requirements, architectures and network management framework. In addition, it introduces the main enablers for realizing future flexible, on-demand multi-tenant networks. The main contribution of this paper is the analysis and design of a signaling-based, i.e. with no human intervention, on-demand multi-tenant network building on the top of 3GPP network sharing management architecture. In the core of our proposed on-demand multi-tenant network architecture lies a logically centralized monitoring and control entity defined as a 5G Network Slice Broker providing admission control for incoming requests (placed by MVNOs, OTTs and verticals) and resource assignment by means of enhancement of the 3GPP network sharing management architecture interfaces and Service Exposure Capability Function (SECF).

Information related to slice resource transactions may be recorded in distributed ledgers. Distributed ledgers are a dynamic form of media and have properties and abilities that go far beyond static ledgers. A distributed ledger is a database held and updated independently by each participant (or node) in a large network. The distribution is unique: records are not communicated to various nodes by a central authority but are instead independently constructed and held by every node. That is, every single node on the network processes every transaction, coming to its own conclusions and then voting on those conclusions to make certain the majority agree with the conclusions. Once there is this consensus, the distributed ledger has been updated, and all nodes maintain their own identical copy of the ledger. This architecture allows for flexibility as a system of records that goes beyond being a simple database.

Information related to slice resource transactions may alternatively be recorded in private blockchains. A private blockchain in a network requires an invitation and must be validated by either the network starter (i.e., the initiator of the private blockchain network, the one that starts a new blockchain network) or by a set of rules put in place by the network starter. Setting up a private blockchain is frequently associated with setting up a permissioned network placing restrictions on participants and transactions. Participants need to obtain an invitation or permission to join. Various access control mechanism may be used: existing participants could decide future entrants; a regulatory authority could issue licenses for participation; or a consortium could make the decisions instead. Once an entity has joined the network, it will play a role in maintaining the blockchain in a decentralized manner.

The Linux Foundation's Hyperledger Fabric is an example of a permissioned blockchain framework implementation and one of the Hyperledger projects hosted by The Linux Foundation. It has been designed ground up to cater to these enterprise requirements. This type of permissioned blockchain model offers the ability to realize significant benefits. Digital identity in particular is fundamental for most industry use cases, such as handling supply chain challenges, disrupting the financial industry, or facilitating security-rich patient/provider data exchanges in healthcare. Only the entities participating in a particular transaction have knowledge and access to it. Permissioned blockchains also permit scalability a few orders of magnitude greater in terms of transactional throughput.

Satoshi Nakamoto's Bitcoin protocol (described in Bitcoin's white paper entitled "Bitcoin: A Peer-to-Peer Electronic Cash System") was the first to successfully apply the concept of a distributed public ledger to peer-to-peer transactions. Unlike public protocols, private blockchains require having permission to access and operate as a centralized organization. Entry control procedures can vary from giving existing participants power to nominate future entrants to having a predetermined set of steps a user must complete for their access rights. After joining the network, any entity plays its part in maintaining the blockchain in a decentralized manner. Since the system relies on internal participants to verify transactions, there are not the same theoretic incentive mechanisms in place to secure the network. Private blockchains are more efficient in terms of scalability and compliance with regulatory requirements but are vulnerable to network manipulation due to the centralized governance.

A subset of the private protocol is federated or consortium blockchains in which the consensus mechanism is predefined by leaders within the network. As an example, imagine a scenario where a group of financial institutions want to transact with each other, such as LIBOR. The consensus mechanism may state that 8 out of 12 banks must approve the transaction for it to be valid. Similar to private blockchain, consortiums are often faster, more scalable and offer greater transaction privacy then public blockchains.

Private blockchains keep information from being seen by the general public and rely on their limited private networks to maintain the integrity of the blockchain protocol itself. Therefore, the blockchain is more vulnerable to being hacked or altered by those within the network, which is especially concerning for federated or consortium blockchains where colluding banks may alter information within their internal networks (e.g., debt obligations between them). Public blockchains, on the other hand, can be maintained by anyone with sufficient computing power to do so and allow for full transparency of the information they contain. Public blockchain protocols were the original concept that Satoshi Nakamoto created, decentralizing information to limit the potential for nefarious acts.

In view of the above discussion of existing techniques, tracking resource usage and allocation among all actors in a sliced network dynamic environment while ensuring security, consistency, automation and operation speed remains a challenge. There is no definite agreement regarding the manner of sharing and handshaking resources in a complex multi-tenant 5G network scenario, tracking operations and charging them to minimize disputes.

To ease understanding, abbreviations used in this document and their explanations are listed below.
3GPP 3rd Generation Partnership Project
5G $5^{th}$ generation of wireless network standards
API Application Programming Interface
BSS Business Support System
CPU Central Processing Unit
E2E End-to-End
eMBB enhanced Mobile Broadband
EMS Element Management System
ETSI European Telecommunications Standards Institute
FU Final User
KPI Key Performance Indicators
InP Infrastructure Provider
IoT Internet of Things
ITU International Telecommunication Union
MANO Management and Orchestration
MEC Mobile Edge Computing
mMTC massive Machine Type Communications
MNO Mobile Network Operator
MVNO Mobile Virtual Network Operator
NFV Network Functions Virtualization
NFVI NFV Infrastructure
NFVO NFV Orchestrator
NGMN Next Generation Mobile Networks
NS Network Slice
NSI Network Slice Instance
NSSI Network Slice Subnet Instance
OSS Operations Support System
OTT Over-The-Top
PNF Physical Network Function
QoS Quality of Service
RAM Random Access Memory
RAN Radio Access Network
RC Resource's Rate Cost
RPO Resource Provider/Owner
SDN Software Defined Network
SLA Service Level Agreement
SP Slice Provider
TS TimeStamp
uRLLC ultra-Reliable and Low-Latency Communications
VIM Virtualized Infrastructure Manager
VNF Virtual Network Function
VNMF VNF Manager

SUMMARY

In methods and devices according to various embodiments, uses the permissioned blockchain technology in the network slice context. By storing transaction records in a permissioned blockchain, a smart contract traces all information related to resource usage in a secure and trustworthy fashion. The permissioned blockchain stores unalterable data containing all details regarding the resource, time used, performance indicators, etc. A distributed ledger may be used to add the records in the permissioned blockchain to ensure security and consistency of the information to all parties involved.

According to an exemplary embodiment, there is a method for a network operator device performing as a slice provider in a communication network. The method including receiving a user request for creating a network slice for a network user, the user request specifying one or more requirements to be met by the network slice. The method further includes setting up the network slice using resources including at least one resource provided by a resource provider according to a service level agreement, and causing an allocation record be stored in a permissioned blockchain, the allocation record memorializing a smart contract for the at least one resource according to the service level agreement.

According to another embodiment there is a network operator device functioning as a slice provider in a communication network. The device has a communication interface configured to receive and submit communications from other network devices including a user request for creating a network slice for a network user. The device also includes a data processing unit connected to the communication interface and configured (1) to extract one or more requirements to be met by the network slice from the user request for creating the network slice, (2) to set up the network slice using resources including at least one resource provided by a resource provider according to a service level agreement, and (3) to cause an allocation record to be stored in a permissioned blockchain, the allocation record memorializing a smart contract for the at least one resource according to the service level agreement. The network slice is a software-defined end-to-end sub-network employing the resources and records including the allocation record that are stored in the permissioned blockchain are unalterable.

According to yet another embodiment, there is a network operator device functioning as a slice provider in a communication network. The device includes a transceiver that receives a user request for creating a network slice for a network user, the user request specifying one or more requirements to be met by the network slice. The device further includes a processor configured to set up the network slice using resources including at least one resource provided by a resource provider according to a service level agreement, and a blockchain-writing module configured to cause an allocation record to be stored in a permissioned blockchain, the allocation record memorializing a smart contract for the at least one resource according to the service level agreement.

According to an embodiment there is a computer readable recording medium storing executable codes that, when executed by a computer, make the computer operate as a slice provider in a communication network performing a method for a network operator device performing as a slice provider in a communication network. The method including receiving a user request for creating a network slice for a network user, the user request specifying one or more requirements to be met by the network slice. The method further includes setting up the network slice using resources including at least one resource provided by a resource provider according to a service level agreement, and causing an allocation record be stored in a permissioned blockchain, the allocation record memorializing a smart contract for the at least one resource according to the service level agreement.

According to yet another embodiment there is a computer program including instructions which, when executed on at least one processor, cause the at least one processor to carry out a method for a network operator device performing as a slice provider in a communication network. The method including receiving a user request for creating a network slice for a network user, the user request specifying one or more requirements to be met by the network slice. The method further includes setting up the network slice using resources including at least one resource provided by a resource provider according to a service level agreement, and causing an allocation record be stored in a permissioned blockchain, the allocation record memorializing a smart contract for the at least one resource according to the service level agreement.

According to an embodiment, there is a method for a resource provider device in a communication network. The method includes receiving a resource request for a resource to be used for creating a network slice, wherein the resource has to meet one or more specified requirements. The method further includes responding to the resource request by providing a smart contract offer for the resource including a service level agreement, and periodically causing a monitoring record for an assessment as to whether the resource keeps meeting the one or more specified requirements be stored in a permissioned blockchain.

According to another embodiment, there is a resource provider device in a communication network. The device includes a communication interface configured to receive and transmit information via the communication network, the information including a resource request for a resource has to meet one or more requirements. The device also includes a data processing unit connected to the communication interface and configured: (1) to respond to the resource request by providing a smart contract offer including a service level agreement, SLA, for the resource able to meet the one or more requirements, and (2) to periodically cause a monitoring record for an assessment as to whether the resource meets the one or more specified requirements be stored in a permissioned blockchain.

According to another embodiment, there is a resource provider device in a communication network having a transceiver, a processor and a blockchain-writing module. The transceiver is configured to receive a resource request for a resource to be used by a network slice, wherein the resource has to meet one or more specified requirements. The processor is configured to respond to the resource request by providing a smart contract offer including a service level agreement. The blockchain-writing module is configured to periodically cause a monitoring record for the resource be stored in a permissioned blockchain.

According to another embodiment, there is a computer readable recording medium storing executable codes that, when executed by a computer, make the computer operate as a slice provider in a communication network by performing a method for a resource provider device in a communication network. The method includes receiving a resource request for a resource to be used for creating a network slice, wherein the resource has to meet one or more specified requirements. The method further includes responding to the resource request by providing a smart contract offer for the resource including a service level agreement, and periodically causing a monitoring record for an assessment as to whether the resource keeps meeting the one or more specified requirements be stored in a permissioned blockchain.

According to yet another embodiment there is a computer program including instructions which, when executed on at least one processor, cause the at least one processor to carry out a method for a resource provider in a communication network. The method includes receiving a resource request for a resource to be used for creating a network slice, wherein the resource has to meet one or more specified requirements. The method further includes responding to the resource request by providing a smart contract offer for the resource including a service level agreement, and periodically causing a monitoring record for an assessment as to whether the resource keeps meeting the one or more specified requirements be stored in a permissioned blockchain.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 12 is a flowchart of a resource provider method according to an embodiment; and FIG. 13 is a modular device operating as resource provider according to another embodiment.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements within the scope of the claims.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

The embodiments described hereinafter are related to network slice providers requiring resources from resource providers. Allocation/deallocation of the resources may be based on automatic evaluation of some rules like slice priority or compensation. It is assumed that a list of available resources is maintained (updated when a resource is allocated/de-allocated). The embodiments provide the possibility to trace any slice resource-related activity in a blockchain. Each resource shared for a slice has a unique ID. The blockchain holds records about resource's transaction history in terms of temporary owners, KPI parameters, used time, and so on.

A permissioned blockchain is set up with all actors involved in the resource sharing activity registered to the blockchain. Actors are mainly Resource Providers/Owners (RPOs) and Slice Providers (SPs). A list of available resources maintained by the RPOs owning them can be accessed by any SP seeking resources. For each available resource, the list includes a pointer to the most recent deallocation record. Transaction records in the blockchain may register resource-sharing for different slices of the same SP, or of different SPs. The shared resources may be computation units, memory, links, frequencies, etc.

Figure 1:
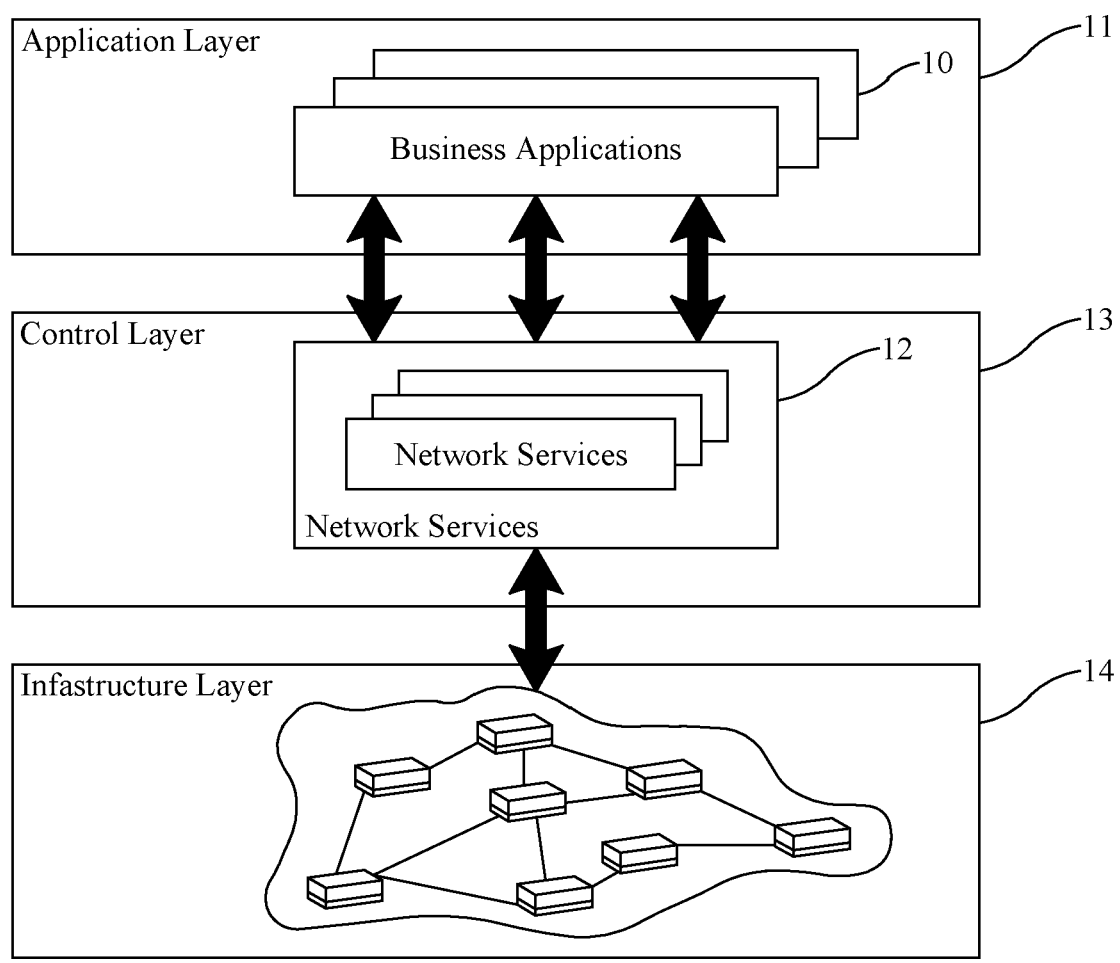
FIG. 1 illustrates the SDN concept.
Figure 2:
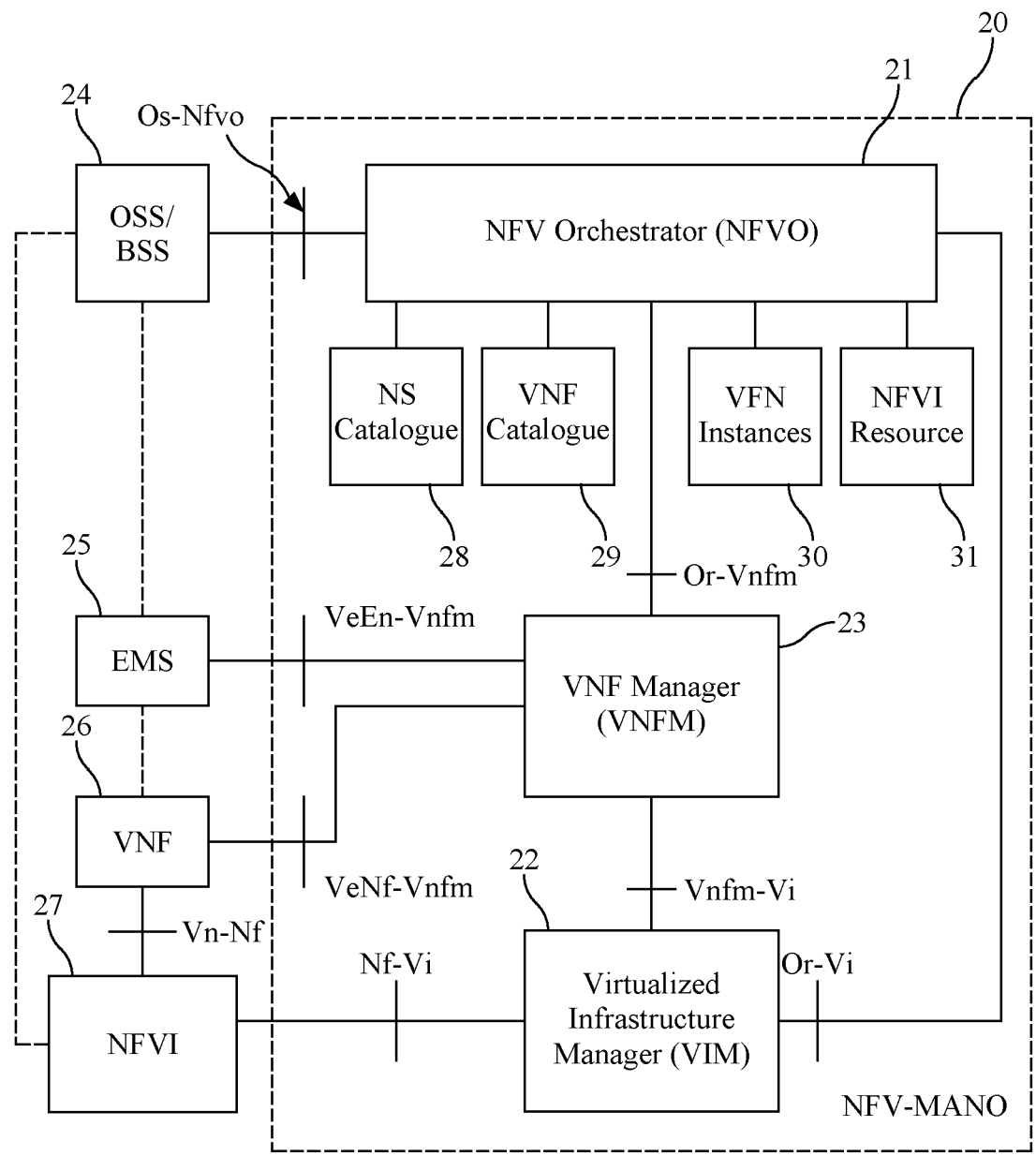
FIG. 2 illustrates a network functions virtualization management and orchestration architecture.
Figure 3:
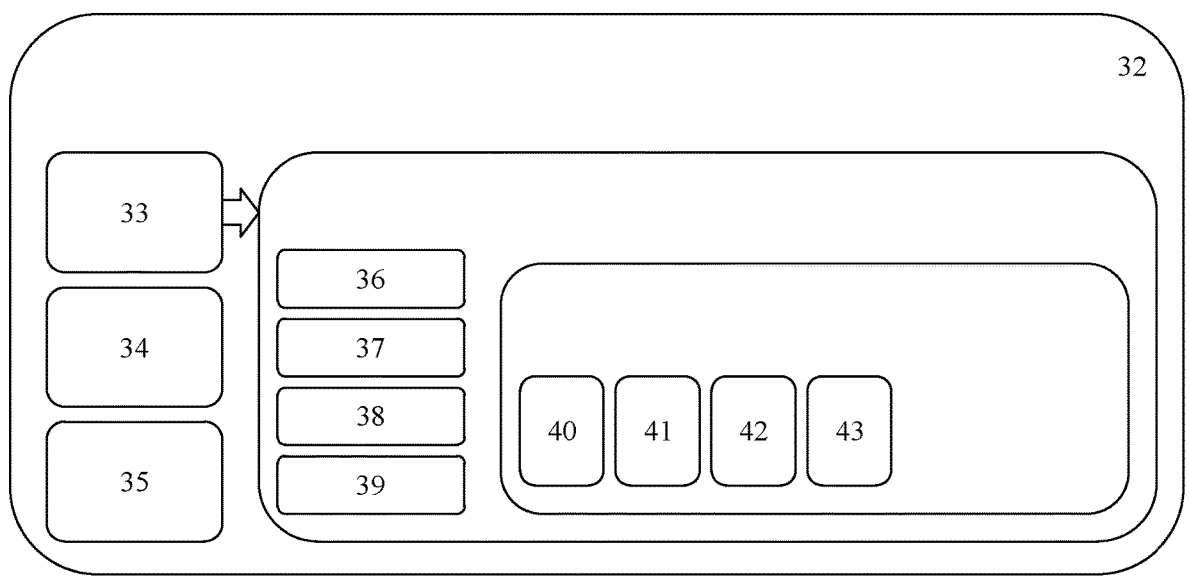
FIG. 3 illustrates a network slice's levels.
Figure 4:
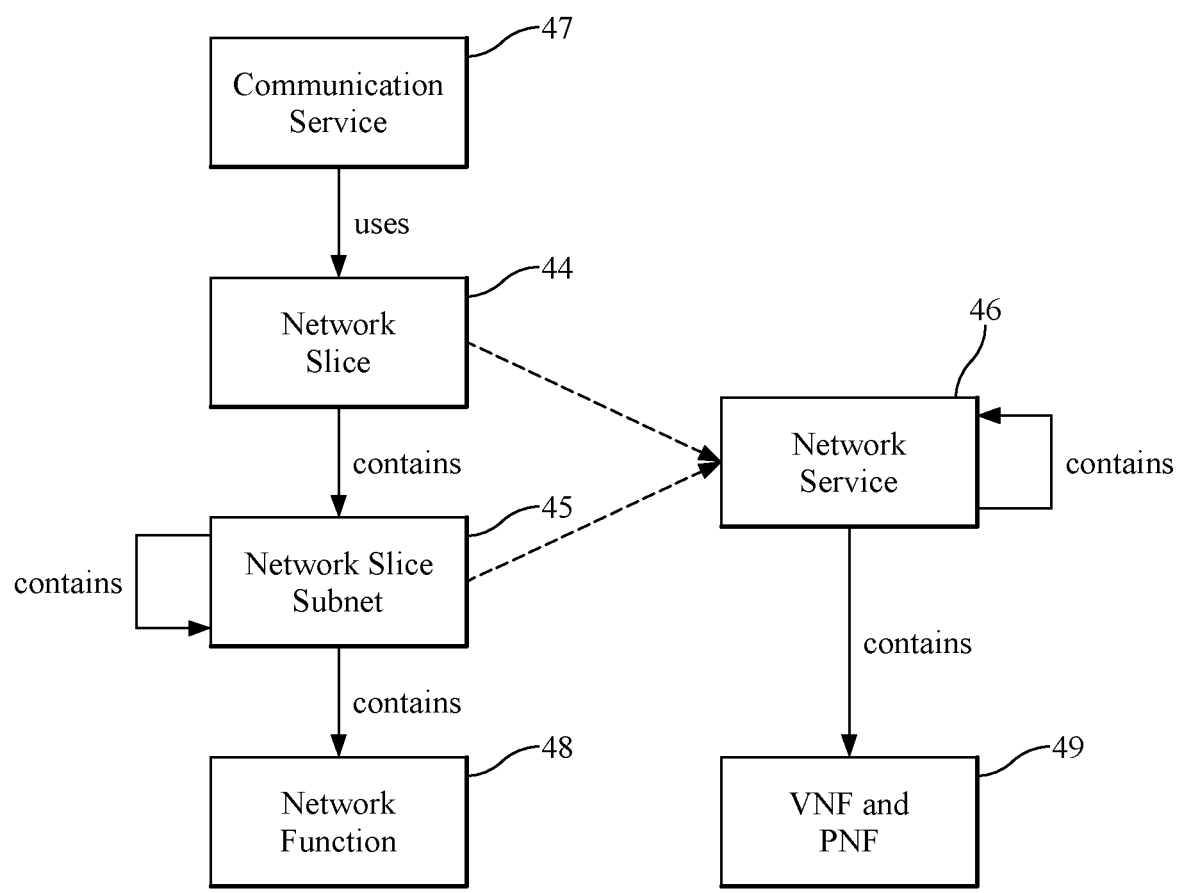
FIG. 4 illustrates correspondence between 3GPP and ETSI NVF network slice concepts.
Figure 5:
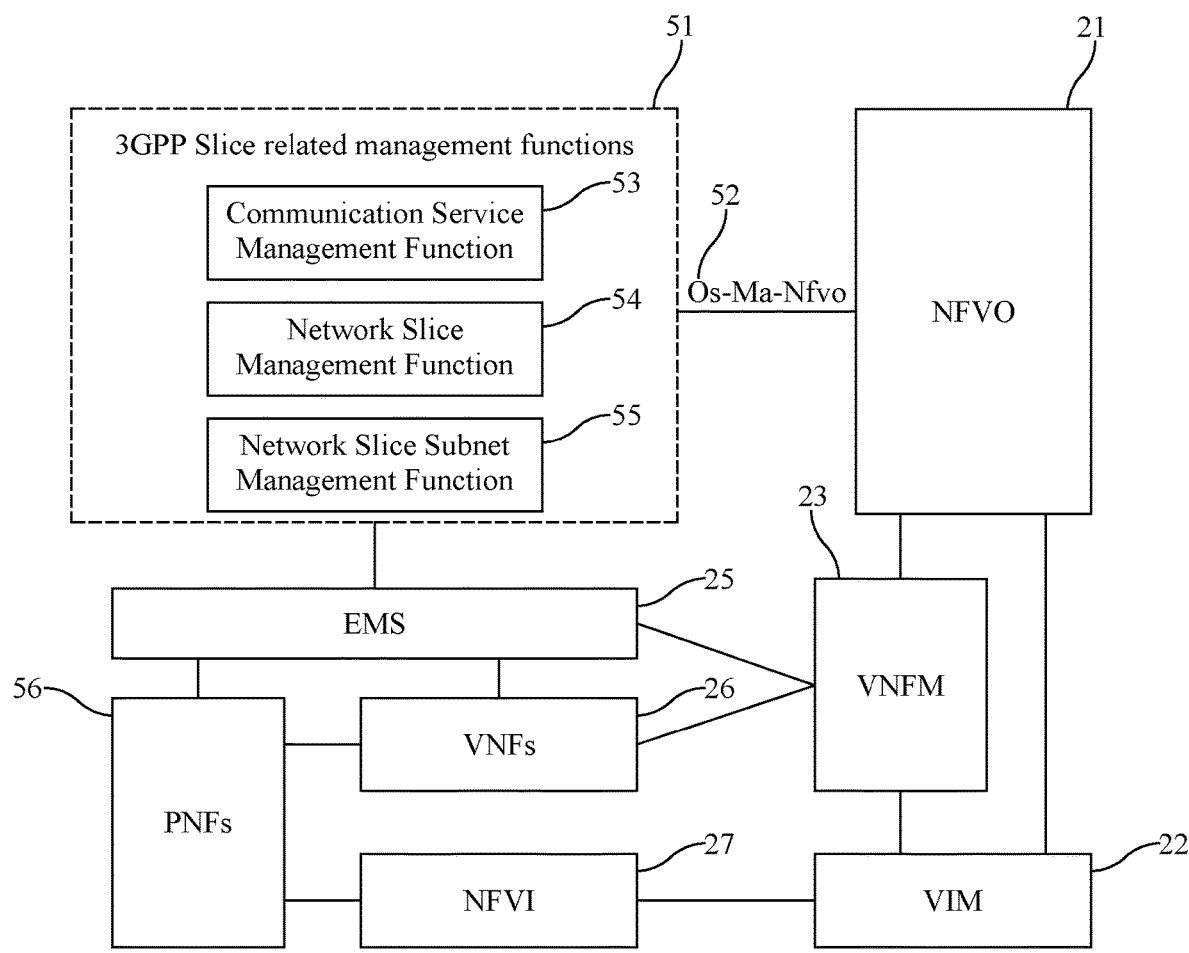
FIG. 5 illustrates 3GPP network slice management in the NFV framework.
Figure 6:
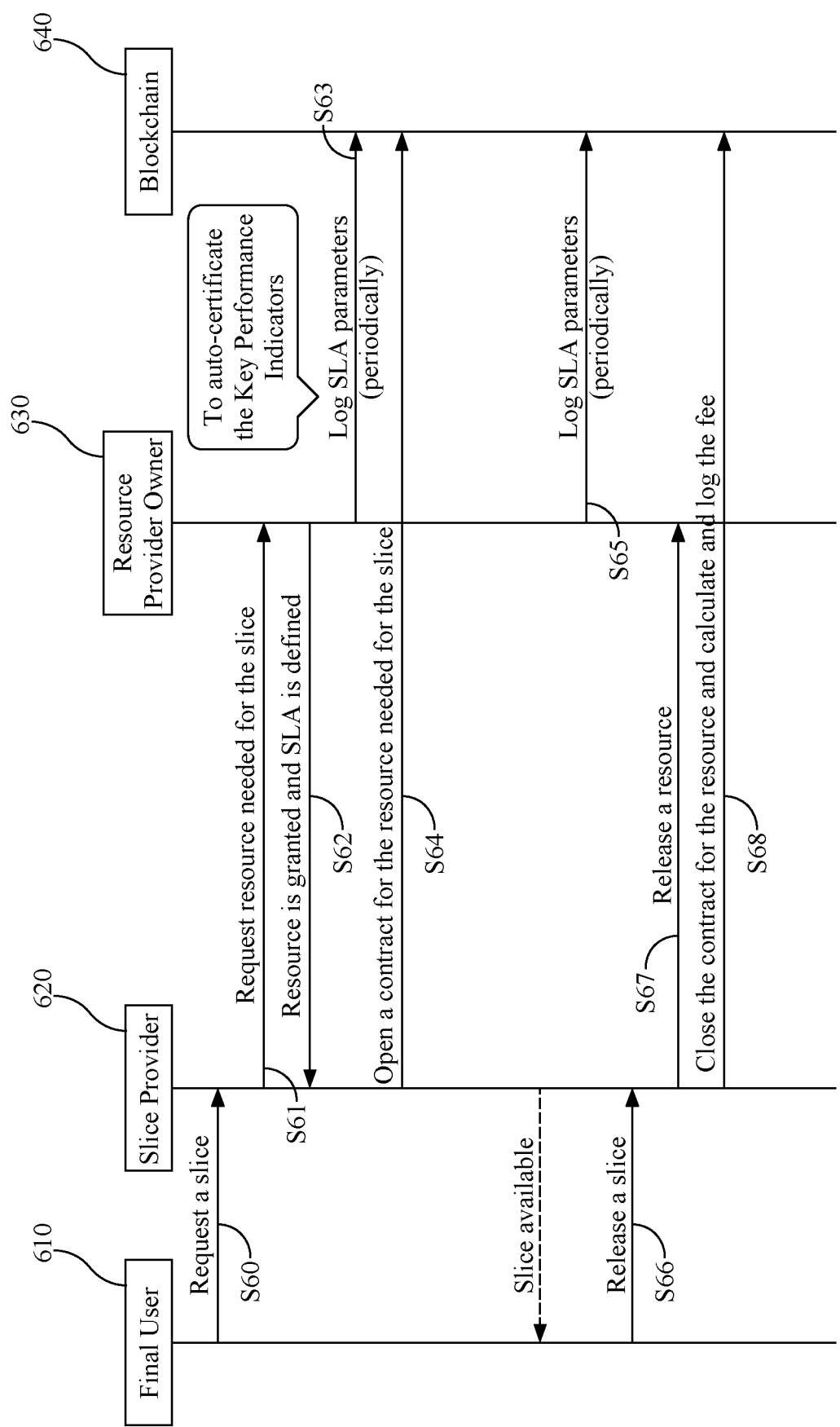
FIG. 6 illustrates a scenario according to an embodiment.

FIG. 6 illustrates a scenario (time flowing from the top of the figure down) for allocating available resources according to an embodiment. The actors in this scenario are a final user (FU) 610, a slice provider (SP) 620, a resource provider (RPO) 630 and a blockchain 640. At S60, FU 610 requests a slice from SP 620. If SP 620 cannot satisfy the request with its current level of assigned resources, it sends a request to RPO 630 at S61. RPO 630 locates virtual resources for FU's slice and allocates them to SP 620 at S62, the allocated resources being associated with an SLA. At S64, SP 620 adds an allocation record related to the shared resource being used for the FU's slide (i.e., register a smart contract in the blockchain). At S63 and S65, RPO 630 causes parameter monitoring records be stored in the blockchain. SP 620 notifies FU 610 that the requested network slice is available.

Later, when FU 610 notifies SP 620 about releasing the slice at S66, SP 620 releases the resource to RPO 630 at S67. RPO then adds the resources to the list of available resources. SP 620 then causes a deallocation record to be stored in blockchain 640 at S68. Then SP 620 closes the smart contract for the shared resource calculating the cost based on the SLA conditions. The parameter monitoring records enable assessing whether major violations of the SLA (e.g., ones that affect the cost) have occurred. A level of SLA fulfillment (e.g., to what degree times for how long minimal requirements were met) may be calculated.

The compensation (also called cost or fee) due to the RPO providing a slice resource may be calculated based on the usage time and the agreed SLA. If SLA minimum agreed has been met, the contract has been a success and logs the calculated compensation in the blockchain (e.g., in the deallocation record). Else a partial fee or no fee is logged. Optionally, if a resource is allocated for a long time a flat rate may be applied before the end of the contract. The resource rate (i.e., cost per time unit) may vary during the contract.

Figure 7:
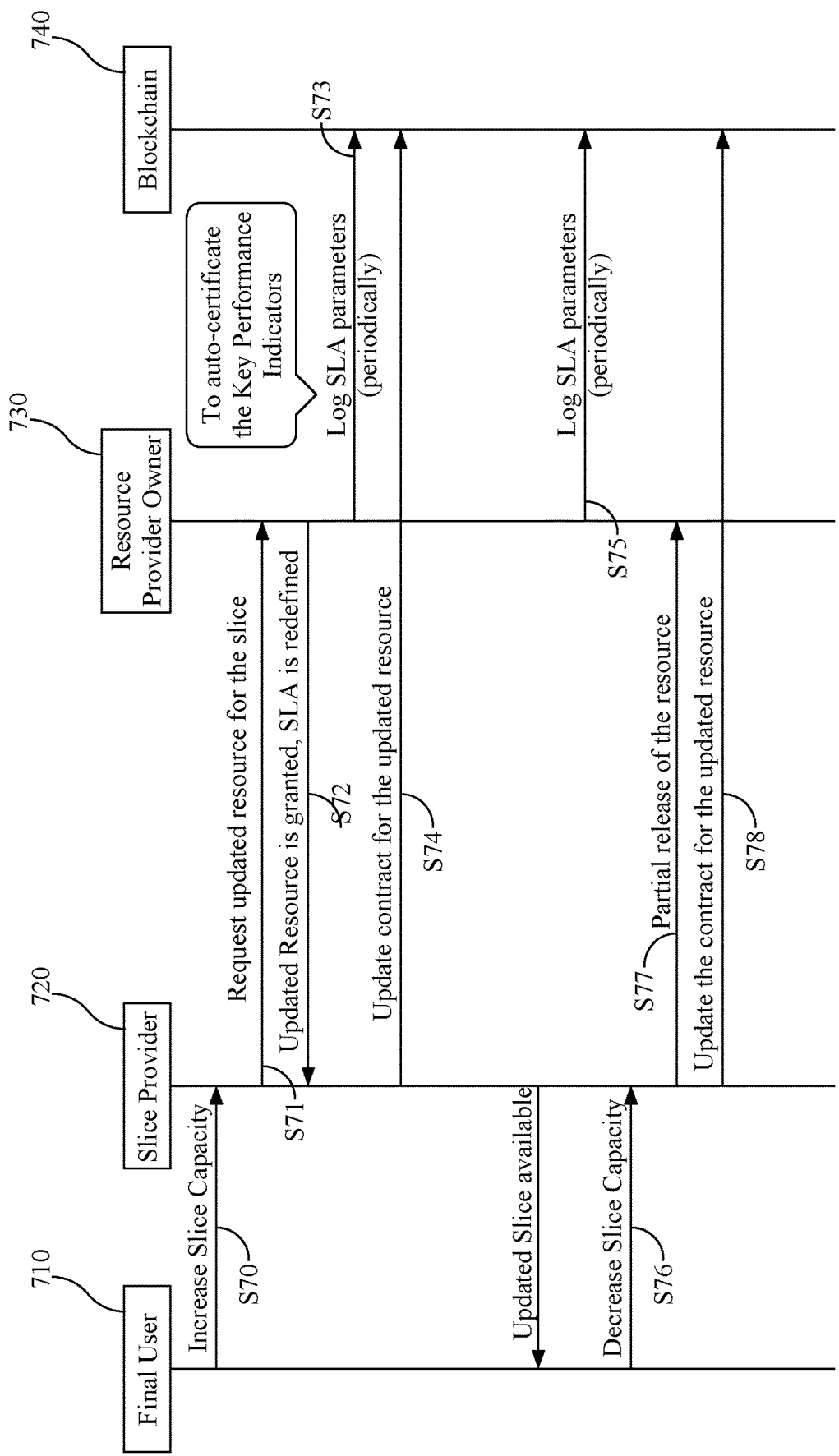
FIG. 7 illustrates another scenario according to an embodiment.

FIG. 7 illustrates another scenario (time again flowing from the top of the figure down) for a change in the allocated resources. Similar to FIG. 6, the actors are a final user (FU) 710, a slice provider (SP) 720, a resource provider (RPO) 730 and a blockchain 740. It is assumed that a network slice for FU 710 has previously (not shown been created). At S70, FU 710 requests slice's capacity be increased. SP 720 sends a request to RPO 730 at S71. RPO 730 locates additional resources for FU's slice and allocates them to SP 720 at S72, the allocated resources being associated with a previous or a new SLA. At S74, SP 720 opens a new contract causing an allocation record related to the additional resources to be stored in the blockchain. At S73 and S75, RPO 730 causes parameter monitoring records be stored in the blockchain. SP 720 then notifies FU 710 about the slice with increased capacity being available.

Later, when FU 710 notifies SP 720 about releasing the slice at S76, SP 720 releases the resource to RPO 730 at S77. RPO then adds the resources to the list of available resources. SP 720 also causes a deallocation record to be stored in blockchain 740 at S78. The same cost-related remarks as relative to the scenario in FIG. 6 are pertinent for this embodiment and are not repeated.

Figure 8:
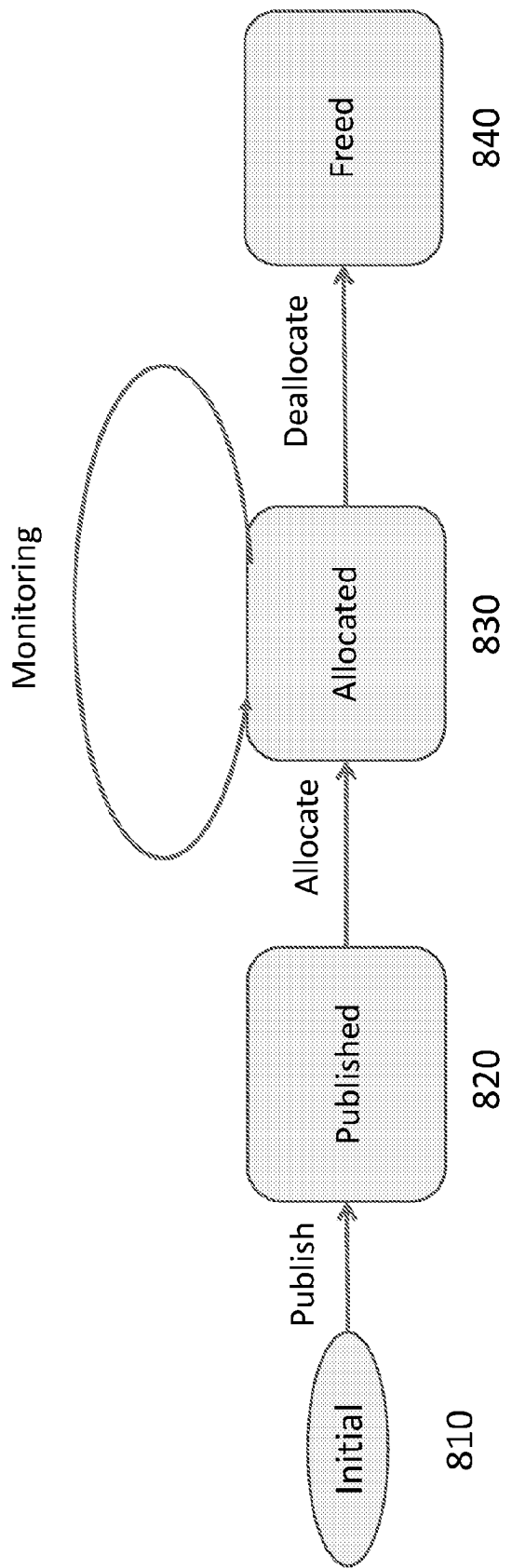
FIG. 8 illustrates a resource use according to an embodiment.

FIG. 8 illustrates a resource use according to an embodiment. At 810 the resource is connected to the communication network. Resource's presence is made known by publishing so as the resource is available at 820. The resource is requested and allocated according to an SLA at 830. The allocated resource usage (e.g., its KPI's) is monitored to enable assessing compliance with the SLA. When the resource is deallocated, it becomes free for other use at 840. The resource may be reallocated to transition to 830 without going again through 810 and 820. Although not shown, it is foreseeable that the resource may be intentionally or accidentally disconnected, requiring then again going through 810 and 820.

The RPO may log in a ledger and/or the blockchain the following information:

1) resources that are available to be used by other operators or slices,
2) characteristics of the resources like type (link, VNF, frequency), location,
3) a resource that has been allocated to an operator/slice
4) the SLA parameters values (as measured) with an agreed periodicity.

An allocation or resource increase pseudocode is set forth below.

```
for each RPO
    search an available resource meeting slice requirement
    if resource found then //Smart Contract is triggered
        lock (confirm) the RPO resource allocation to the SP
        allocate the resource to the slice
        record the transaction of allocation in the blockchain
        break
    end if
end for
```

The allocation record may include:

Transaction type/transaction id
SP id
Slice id
RPO id
VR id
RC
TSi (initial TimeStamp)
Required SLA for the VR
Reference to the last transaction which made the resource available (to check easily if the resource was actually freed by the time it was newly allocated).

A (periodic) parameter monitoring pseudocode is set forth below.

```
for each locked resource
    if contract period expired
        read the resource monitoring parameters
        if not complied with the SLA
            start possible actions to achieve SLA compliance
        end if
        record SLA compliance level and TS
    end if
end for
```

A monitor record in the blockchain may include:
Monitoring Record id
Transaction type/transaction id
TSn (Intermediate Time Stamp)
Measured SLA: List of Metrics/Counter.

An allocation or resource increase pseudocode is set forth below.

```
assess SLA compliance
    calculate the cost rate according to SLA compliance
    calculate the total cost
    release the resource
    record the deallocation record in the blockchain
    trigger payment (for example using crypto money)
```

The deallocation record may include:
Transaction type/transaction id
SP id
Slice id
RPO id
VR id
TSf (final TimeStamp)
Measured SLA: List of Parameter Monitoring Records
Fee/Cost
Final result: Successful, Partial, Unsuccessful The compensation may be calculated according to the following formula:

$$\text{Final Cost} = (TSf - TSi) \times RC \times SLA \text{ Factor} \quad (1)$$

wherein the SLA factor quantifies the level of SLA fulfillment. For example, if the final result is Successful then SLA Factor=1, if the final result is Partial, then the SLA Factor is less than 1 but larger than 0, for example 0.5 and if the final result is Unsuccessful then SLA Factor=0.

The available resource list may be stored by the RPOs in a separate wallet/database. The SP then queries each RPO to find the needed slice resource meeting the requirements. In one embodiment, the RPO provides an indication that a resource meeting the requirements is in process of becoming available, while outputting only the resource info if the resource is currently available (i.e., free when the RPO has been queried).

Figure 9:
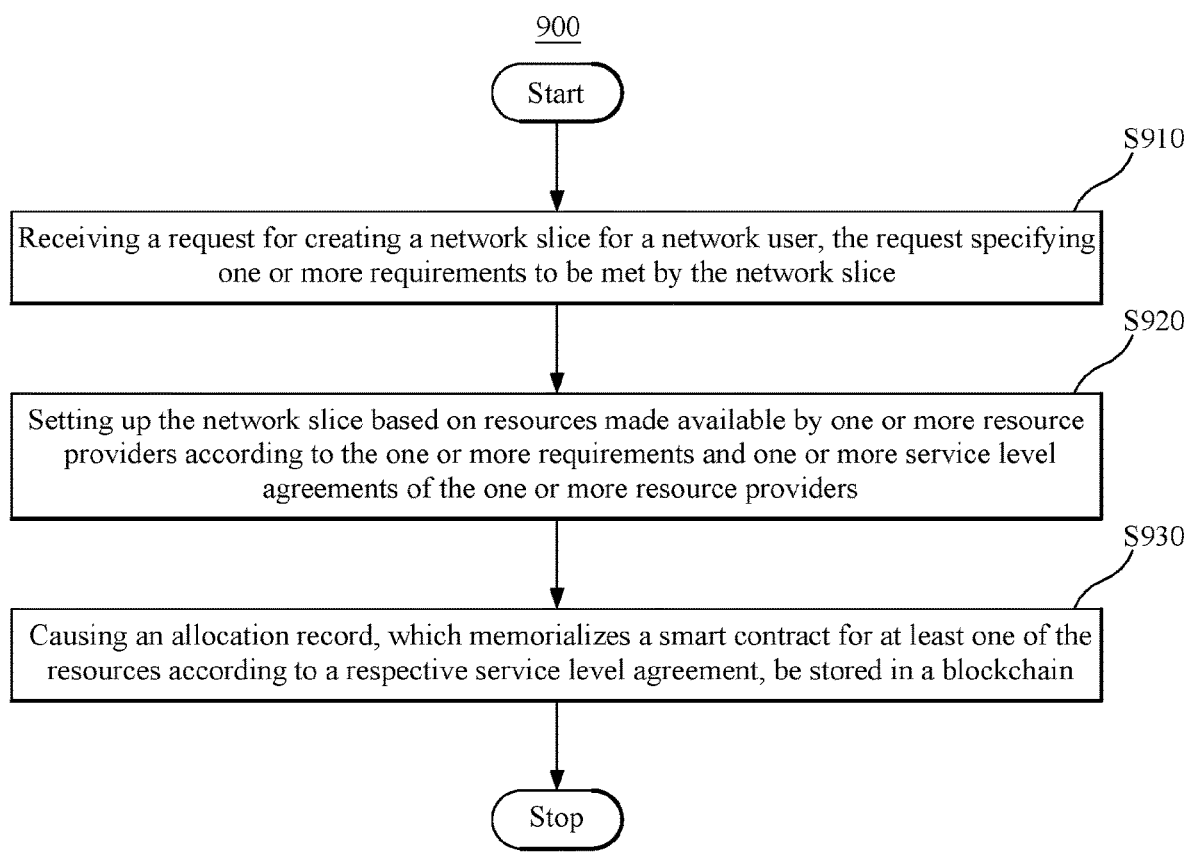
FIG. 9 is a flowchart of a slice provider method according to an embodiment.

FIG. 9 is a flowchart of a method 900 for a network operator device operating as a slice provider (e.g., 620 in FIG. 6) in a communication network. The communication network may be a 5G network.

Method 900 includes receiving a request for creating a network slice for a network user, the request specifying one or more requirements to be met by the network slice at S910. The method further includes setting up the network slice based on resources made available by one or more resource providers (e.g., 630 in FIG. 6) according to the one or more requirements and one or more SLAs at S920. Method 900 then includes causing an allocation record, which memorializes a smart contract for at least one of the resources according to a respective SLA, be stored in a blockchain (e.g., 640) at S930. The term "causing" indicates that method 900 is amenable to cloud execution case in which the physical location of the blockchain does not have to be specified.

The network slice is a software-defined end-to-end subnetwork using the resources. The blockchain records cannot be modified. The allocation record may include one or more of: a transaction type (e.g., ALLOCATE_NEW_SLICE, INCREASE_RESOURCE, DECREASE_RESOURCE, MONITORING_PARAMETER), a transaction identifier, a slice identifier, a resource provider identifier, a resource identifier, resource price information (e.g., cost rate), an initial time, required performance according to the SLA, and the most recent transaction related to the at least one resource (i.e., if most recent transaction was a deallocation record then the resource is available).

In one embodiment, the method further includes notifying the network user when the network slice becomes available. The method may also include receiving a user request for releasing the network slice, notifying the resource provider about releasing the resource and causing a deallocation record that concludes the smart contract be recorded in the blockchain. The deallocation record may include one or more of the transaction type, the transaction identifier, the slice identifier, the resource provider identifier, the resource identifier, a final time, a provided SLA, a final cost, and a resource use assessment.

In an embodiment, method 900 may further include receiving a user request for increasing or decreasing the at least one of the resources used by the network slice, requesting the one or more resource providers to adjust the at least one of the resources according to the user request and causing an updated allocation record, which memorializes an updated smart contract for the at least one of the resources adjusted according to the user request be recorded in the blockchain.

Figure 10:
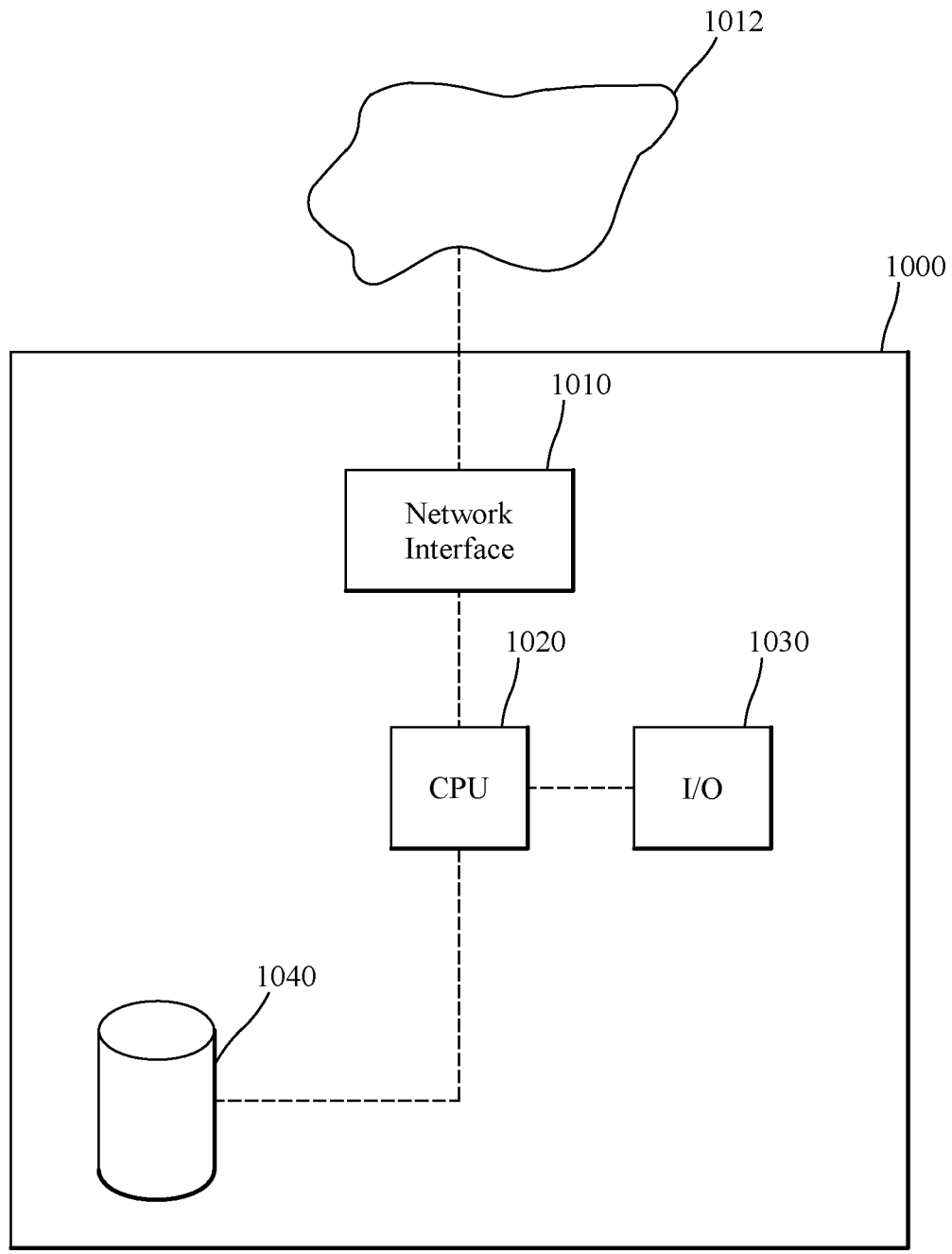
FIG. 10 is a schematic diagram of a slice provider or resource provider according to an embodiment.

FIG. 10 is a schematic diagram of a device 1000 which may operate as a slice provider. Device 1000 is a network operator device communicating with other devices via communication network 1012. Device 1000 includes a communication interface 1010 configured to receive and submit communications from other network devices, a data processing unit 1020 connected to interface 1010 and, optionally, to a user interface 1030 and/or to a data storage unit 1040 (e.g., a memory). Data processing unit 1020 is configured (1) to extract one or more requirements to be met by a network slice for a network user from a request for creating the network slice;
(2) to set up the network slice based on resources made available by one or more resource providers according to the one or more requirements and one or more service level agreements, SLAs, of the one or more resource providers; and
(3) to cause an allocation record, which memorializes a contract for at least one of the resources according to a respective SLA, be recorded in a blockchain The data processing unit may further be configured to notify the network user via the communication interface when the network slice becomes available.

Figure 11:
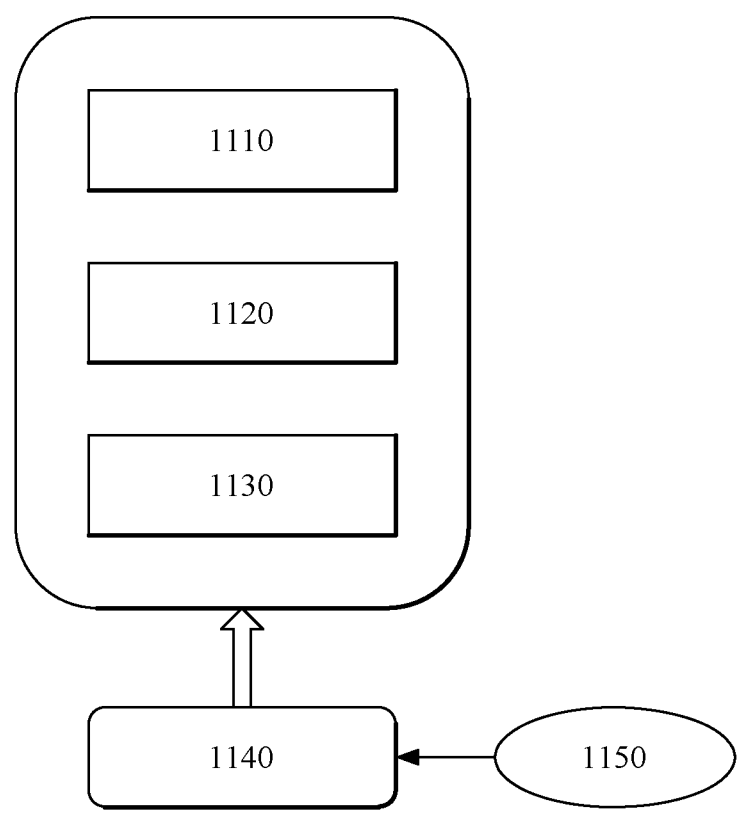
FIG. 11 is a modular device operating as a slice provides according to an embodiment.

FIG. 11 illustrates a modular device 1100 operating as a source provider according to an embodiment. The device includes a transceiver 1110, a processor 1120 and a blockchain-writing module 1130. Transceiver 1110 that receives a request for creating a network slice for a network user, the request specifying one or more requirements to be met by the network slice. Processor 1120 is configured to set up the network slice based on resources made available by one or more resource providers according to the one or more requirements and one or more SLAs of the one or more resource providers. Blockchain-writing module 1130 is configured to cause an allocation record to be recorded in a permissioned blockchain. The allocation record memorializes a smart contract for at least one of the resources according to a respective SLA. The processor may further be configured to notify the network user via the transceiver when the network slice becomes available. Additionally or alternatively, the processor may further be configured to notify the one or more resource providers about releasing the resources and to cause a deallocation record that concludes the smart contract be recorded in the permissioned blockchain when the transceiver receives a request for releasing the network slice. The allocation and deallocation records may have the previously specified content. The processor may also be configured to calculate final cost (fee) based at least on the allocation record and the deallocation record. In one embodiment, the processor further uses resource monitoring records for calculating the final cost (fee). The resource monitoring may be periodic and log information enabling the processor to assess SLA compliance for calculating the final cost (fee).

The processor may further be configured to request the one or more resource providers to adjust the at least one of the resources according to a user request, and to cause an updated allocation record, which memorializes an updated smart contract for the at least one of the resources adjusted according to the other user request, be recorded in the permissioned blockchain, when the transceiver receives the other user request for increasing or decreasing the at least one of the resources used by the network slice.

FIG. 12 is a flowchart of a method 1200 for a network device operating as a resource provider in a communication network according to an embodiment. Method 1200 includes receiving a resource request for a resource to be used for creating a network slice, wherein the resource has to meet one or more specified requirements at S1210. The method then includes responding to the resource request by providing a smart contract offer for the resource including an SLA at S1220. The method then includes periodically causing a monitoring record for an assessment as to whether the resource keeps meeting the one or more specified requirements be stored in a permissioned blockchain at S1230.

In one embodiment, the method further includes obtaining resource monitoring parameters for the resource and assessing an SLA compliance based on the resource monitoring parameters, when preparing the monitoring record. The monitoring record may include a record identifier, a transaction type, a transaction identifier, a monitoring stamp, and the resource monitoring parameters. If a result of the assessing is non-compliance, a potentially corrective action may be initiated. The corrective action may depend on the management interface available to heal the resource. For example, manual or automatic intervention (Maintenance) on the resource may make the resource work correctly. If it is not possible to fix the problem, a new resource may be provided to the Slice Provider to substitute the non-compliant one (the non-compliant resource possibly also being removed from a list of available resources). The communication network may be a 5G network.

According to another embodiment a resource provider device may have a structure similar to the one illustrated in FIG. 10. In this case, communication interface 1010 is configured to receive and transmit information via the communication network, the information including a resource request for a resource has to meet one or more requirements. Data processing unit 1020 is configured to respond to the resource request by providing a smart contract offer including an SLA for a resource able to meet the one or more requirements, and to periodically cause a monitoring record for an assessment as to whether the resource meets the one or more specified requirements be stored in a permissioned blockchain.

The data processing unit may be further configured to obtain resource monitoring parameters related to the resource, and to assess an SLA compliance based on the resource monitoring parameters, while preparing the monitoring record. The monitoring record may include a record identifier, a transaction type, a transaction identifier, a monitoring stamp, and the resource monitoring parameters. The data processing unit may initiate a potentially corrective action if a result of the assessing is non-compliance. The communication network may be a 5G network.

FIG. 13 illustrates a resource providing device 1300 according to another embodiment. Resource providing device 1300 has a transceiver 1310, a processor 1320 and a blockchain-writing module 1330. Transceiver 1310 is configured to receive a resource request for a resource to be used by a network slice, wherein the resource has to meet one or more specified requirements. Processor 1320 is configured to respond to the resource request by providing a smart contract offer including an SLA. Blockchain-writing module 1330 is configured to periodically cause a monitoring record for the resource be stored in a permissioned blockchain.

The processor may be further configured to obtain resource monitoring parameters related to the resource, and to assess an SLA compliance based on the resource monitoring parameters, while preparing the monitoring record. The monitoring record may include a record identifier, a transaction type, a transaction identifier, a monitoring stamp, and the resource monitoring parameters. The processor may initiate a potentially corrective action if a result of the assessing is non-compliance. The communication network may be a 5G network.

The above-described embodiments provide methods and devices that enhance security and traceability of resource usage among all actors in the slice network context (e.g., 5G). Furthermore, logging the resource usage is automated and simplified by a smart contract mechanism.

Complex billing operations expected in a 5G multi-tenant network where several parties (i.e., SPs, RPOs, Digital Service Providers, etc.) are involved, is substantially simplified, thereby minimizing the number of disputes. Security and reliability of the resource sharing information is enhanced by a distributed ledger available to all involved parties, ensuring the consistency of the smart contract-related information.

Other advantages achieved by some embodiments are prompt availability and traceability of the slice resources, with the repository of verifiable transactions between operators allowing for quick verification of the distribution of the resources to be shared. The blockchain's "enabled" trust improves coordination between various partners, due to a shared view of transactions and liabilities, which permits the elimination of third parties, thereby yielding cost savings.

The single view of contract-related data (instead of being necessary to consolidate information across various disparate systems) allows for reliable audit trails because all transactions are available in the ledger. Implementation of smart contracts allows for near-instantaneous resource allocation to slices. This approach secures transactions among different layers, namely resource usage, SLA verification, etc.

The above-described advantages facilitate an advanced, dynamic usage of resources among different slices and tenants. If a first entity (slice or tenant) needs a resource not immediately available to accommodate a service request, because the required resource is being temporarily allocated to a second entity, the first entity may ask the second entity to borrow the resource. If the second entity accepts the request and lends the resource for a certain time period, it is compensated by a billing policy.

The disclosed embodiments provide methods and devices related to resource sharing via smart contracts with transaction information stored in a permissioned blockchain. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments describe herein, e.g., systems and methods associated with charging in an IoT environment, may take the form of a computer program product stored on a computer-readable storage medium having computer-readable instructions embodied in the medium. For example, FIG. 10 depicts an electronic storage medium 1040 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for a network operator device performing as a slice provider in a communication network, the method comprising:
   receiving a first user request for creating a network slice for a network user, the first user request specifying one or more requirements to be met by the network slice;
   sending, to a resource provider, a resource request for a resource to be used for creating the network slice, in which the one or more requirements being specified in the resource request;
   receiving, from the resource provider, an offer of a smart contract offer for the resource including a service level agreement (SLA);

setting up the network slice using resources, including at least the resource provided by the resource provider, according to the SLA; and causing, by the slice provider, an allocation record to be stored in a permissioned blockchain, the allocation record memorializing the smart contract for the resource according to the SLA, wherein the resource provider periodically causes a monitoring record for an assessment, as to whether the resource meets the one or more specified requirements, to be stored in the permissioned blockchain and wherein the network slice is a software-defined end-to-end sub-network using the resource and the allocation record that is stored in the permissioned blockchain is unalterable.

2. The method of claim 1, further comprising:
notifying the network user when the network slice becomes available.

3. The method of claim 1, further comprising:
receiving a second user request for releasing the network slice;
notifying the resource provider about releasing the resource; and
causing a deallocation record that concludes the smart contract be recorded in the permissioned blockchain.

4. The method of claim 3, wherein the allocation record includes one or more of:
a transaction type,
a transaction identifier,
a slice identifier,
a resource provider identifier,
a resource identifier,
resource price information,
an initial time,
one or more requirements for the resource according to the SLA, and
a reference to a previous transaction related to the resource.

5. The method of claim 4, wherein the deallocation record includes one or more of:
the transaction type,
the transaction identifier,
the slice identifier,
the resource provider identifier,
the resource identifier,
a final time,
a provided SLA compliance,
a final cost, and
a resource use assessment.

6. The method of claim 1, further comprising:
receiving a third user request for increasing or decreasing the resource used by the network slice;
requesting the resource provider to adjust the resource according to the third user request; and
causing an updated allocation record, which memorializes an updated smart contract for the resource, adjusted according to the third user request, to be recorded in the permissioned blockchain.

7. A network operator device functioning as a slice provider in a communication network, the network operator device comprising:
a communication interface configured to receive and submit communications from other network devices including a first user request for creating a network slice for a network user;
a processor; and
a storage medium storing instructions which, when executed by the processor, cause the network operator device to perform operations to:
receive a first user request to create a network slice for a network user, the first user request specifying one or more requirements to be met by the network slice;
send, to a resource provider, a resource request for a resource to be used to create the network slice, in which the one or more requirements being specified in the resource request;
receive, from the resource provider, an offer of a smart contract for the resource including a service level agreement (SLA);
set up the network slice using resources, including at least the resource provided by the resource provider, according the SLA; and
cause an allocation record to be stored in a permissioned blockchain, the allocation record memorializing the smart contract for the resource according to the SLA, wherein the resource provider periodically to cause a monitoring record for an assessment, as to whether the resource meets the one or more specified requirements, to be stored in the permissioned blockchain and wherein the network slice is a software-defined end-to-end sub-network employing the resource and the allocation record that is stored in the permissioned blockchain is unalterable.

8. The network operator device of claim 7 is further to notify the network user via the communication interface when the network slice becomes available.

9. The network operator device of claim 7 is further to notify the resource provider about releasing the at least resource and to cause a deallocation record that concludes the smart contract to be recorded in the permissioned blockchain when the communication interface receives a second user request for releasing the network slice.

10. The network operator device of claim 9, wherein the allocation record includes one or more of:
a transaction type,
a transaction identifier,
a slice identifier,
a resource provider identifier,
a resource identifier,
resource price information,
an initial time,
one or more requirements for the resource according to the SLA, and
a reference to a previous transaction related to the resource.

11. The network operator device of claim 10, wherein the deallocation record includes one or more of:
the transaction type,
the transaction identifier,
the slice identifier,
the resource provider identifier,
the resource identifier,
a final time,
a provided SLA compliance,
a final cost, and
a resource use assessment.

12. The network operator device of claim 7 is further to request the resource provider to adjust the resource according to a third user request, and to cause an updated allocation record, which memorializes an updated smart contract for the resource, adjusted according to the third user request, to be recorded in the permissioned blockchain, when the communication interface receives the third user request for increasing or decreasing the resource used by the network slice.

13. A resource provider device in a communication network comprising:
   a communication interface configured to receive and transmit information via the communication network, the information including a resource request for a resource specifying one or more requirements;
   a processor; and
   a storage medium storing instructions which, when executed by the processor, cause the resource provider device to perform operations to:
      receive, from a network node operating as a slice provider, a resource request for a resource to be used to create a network slice, in which one or more requirements are specified in the resource request, wherein the resource request is in response to a first user request to create the network slice for a network user and wherein the first user request specifies the one or more requirements to be met by the network slice;
      respond to the resource request by providing an offer of a smart contract for the resource including a service level agreement (SLA) for the resource to be able to meet the one or more requirements, in order for the slice provider to cause an allocation record to be stored in a permissioned blockchain, the allocation record memorializing the smart contract for the resource according to the SLA; and
      periodically cause a monitoring record for an assessment, as to whether the resource meets one or more specified requirements, to be stored in the permissioned blockchain and wherein the network slice is a software-defined end-to-end sub-network using the resource and the allocation record that is stored in the permissioned blockchain is unalterable.

14. The resource provider device of claim 13 is further to obtain resource monitoring parameters related to the resource, and to assess an SLA compliance based on the resource monitoring parameters, while preparing the monitoring record.

15. The resource provider device of claim 14, wherein the monitoring record includes at least one of:
   a record identifier,
   a transaction type,
   a transaction identifier,
   a monitoring stamp, and
   the resource monitoring parameters.

16. The resource provider device of claim 13 is further to initiate a corrective action when a result of the assessment is non-compliance.

* * * * *